US011681720B2

(12) United States Patent
Hovorka et al.

(10) Patent No.: US 11,681,720 B2
(45) Date of Patent: Jun. 20, 2023

(54) DATABASE SEARCHING WHILE MAINTAINING DATA SECURITY

(71) Applicant: Target Brands, Inc., Minneapolis, MN (US)

(72) Inventors: Evan Hovorka, Plymouth, MN (US); Roshine Sereena Jeyachander, Minneapolis, MN (US); Murali Krishna Dandukuri, Kamataka (IN); Rebecca Anne Gesswein, Richfield, MN (US)

(73) Assignee: Target Brands, Inc., Minneapolis, MN (US)

( * ) Notice: Subject to any disclaimer, the term of this patent is extended or adjusted under 35 U.S.C. 154(b) by 232 days.

(21) Appl. No.: 17/117,915

(22) Filed: Dec. 10, 2020

(65) Prior Publication Data

US 2021/0182290 A1  Jun. 17, 2021

Related U.S. Application Data

(60) Provisional application No. 62/946,697, filed on Dec. 11, 2019.

(51) Int. Cl.
*G06F 16/2458* (2019.01)
*G06F 16/248* (2019.01)
*G06F 21/31* (2013.01)
*G06F 21/62* (2013.01)

(52) U.S. Cl.
CPC ........ *G06F 16/2477* (2019.01); *G06F 16/248* (2019.01); *G06F 21/31* (2013.01); *G06F 21/6227* (2013.01)

(58) Field of Classification Search
CPC .... G06F 16/2477; G06F 16/248; G06F 21/31; G06F 21/6227
USPC ........................................................ 707/769
See application file for complete search history.

(56) References Cited

U.S. PATENT DOCUMENTS

| | | | |
|---|---|---|---|
| 7,698,331 B2* | 4/2010 | Carson, Jr. | G06F 16/951 707/728 |
| 8,689,136 B2 | 4/2014 | Ting et al. | |
| 8,935,177 B2 | 1/2015 | Wiley et al. | |
| 10,198,745 B2 | 2/2019 | Kruglick | |
| 10,282,755 B2 | 5/2019 | O'Reilly | |
| 2008/0300977 A1 | 12/2008 | Gerakos et al. | |
| 2009/0216579 A1 | 8/2009 | Zen et al. | |
| 2014/0351048 A1* | 11/2014 | Fordyce | G06Q 30/0277 705/44 |

(Continued)

*Primary Examiner* — Joshua Bullock
(74) *Attorney, Agent, or Firm* — Theodore M. Magee; Westman, Champlin & Koehler, P.A.

(57) ABSTRACT

A method includes receiving a first search term and a second search term and using the first search term to search a first system that associates the first search term with a plurality of people to retrieve a respective identifier for each of the plurality of people. The second search term and the plurality of identifiers are used to search a second system that associates the second search term with a second plurality of people. The second system returns a count of the number of people who are in both the first plurality of people and the second plurality of people but is prevented from associating the first search term with a person and from releasing the association between the second search term and the second plurality of people. The count is returned as the number of people who have both the first search term and the second search term.

20 Claims, 4 Drawing Sheets

(56) References Cited

U.S. PATENT DOCUMENTS

| | | |
|---|---|---|
| 2015/0186930 A1 | 7/2015 | Winner et al. |
| 2015/0193459 A1* | 7/2015 | Duke .................... G06F 16/152 |
| | | 707/736 |
| 2016/0155143 A1 | 6/2016 | Hsiao et al. |
| 2016/0352816 A1* | 12/2016 | Xiao ....................... H04W 4/21 |
| 2018/0144364 A1 | 5/2018 | Sprecher |

* cited by examiner

DATABASE SEARCHING WHILE MAINTAINING DATA SECURITY

CROSS-REFERENCE OF RELATED APPLICATION

The present application is based on and claims the benefit of U.S. provisional patent application Ser. No. 62/946,697, filed Dec. 11, 2019, the content in which is hereby incorporated by reference in its entirety.

BACKGROUND

On the Internet, users interact with various systems to accomplish tasks. In order for the systems to be useful, the systems often keep records of the actions taken by individual users.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a first search term and a second search term as part of a request for a number of people who match both the first search term and the second search term. Using the first search term to search a first system that associates the first search term with a plurality of people to retrieve a respective identifier for each of the plurality of people. The second search term and the plurality of identifiers is then used to search a second system that associates the second search term with a second plurality of people. The second system returns a count of the number of people who are in both the first plurality of people and the second plurality of people but is prevented from associating the first search term with a person and from releasing the association between the second search term and the second plurality of people. The count is returned as the number of people who have both the first search term and the second search term.

In accordance with a further embodiment, a method of isolating systems containing information about people includes allowing a first system containing a first set of information about people to receive a request from a requestor that identifies a first value for the first set of information and a second value for a second set of information, to retrieve respective identifiers for people for whom the first set of information has the first value, and provide the identifiers and the second value to a second system while preventing the first system from returning the identifiers to the requestor and while preventing the first system from providing the first value to the second system. The second system is allowed to receive the identifiers and the second value, to use the identifiers to determine a count of how many of the people represented by the identifiers have the second value for the second set of information while preventing the second system from providing identifiers of the people for whom the second set of information has the second value to any of the first system and the requestor. The count is then returned to the requestor.

In accordance with a still further embodiment, a method includes receiving a request for a number of people who have performed both a first and second action from a requestor and using a first system to identify a list of people who have performed the first action without disclosing the identities of the people to the requestor. The list of identified people is provided to a second system and the second system is used to determine a count of how many of the identified people in the list performed the second action without disclosing which of the identified people performed the second action to any of the first system and the requestor. The count is then returned to the requestor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Users of the Internet have become increasingly concerned about the amount of information that is collected about them. In particular, users dislike when different systems merge the information they have collected about a person into a more detailed depiction of the person. For example, when one system knows of a first action performed by the user and a second system knows of a second action performed by the user, users do not want the first system or second system to combine their data so that one or both of the systems knows that the person has performed both actions. The simplest solution is to create a complete information barrier between the two systems so as to stop any one system from acquiring too much information about the user. However, such a complete barrier overly limits the usefulness of the stored information.

In the various embodiments described below, a computing architecture is provided that allows two secured systems to maintain the secrecy of the data they possess while providing a mechanism to allow for limited merging of the data. In particular, the architecture allows two systems that store different information about a same person to work together to determine whether the person meets certain requirements set in a search query without either system learning the information held by the other system for the person. In addition, the architecture limits users to accessing at most one of the secured systems thereby preventing a user from accessing both sets of data for a same person.

Figure 1:
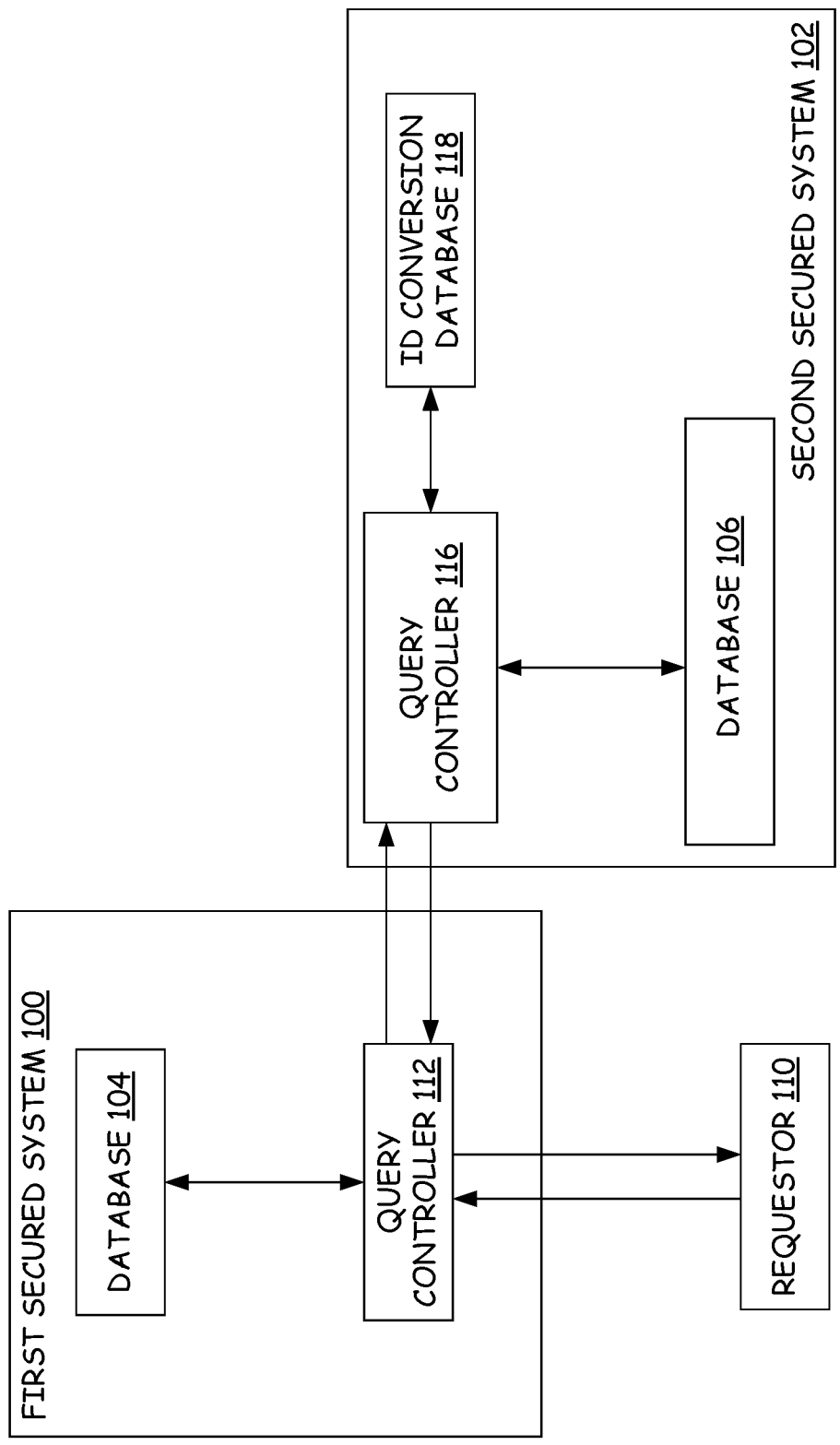
FIG. 1 is block diagram of elements used in one embodiment.

FIG. 1 provides a block diagram of a system architecture in accordance with one embodiment. In the architecture of FIG. 1, a first secured system 100 maintains a database 104 and a second secured system 102 maintains a second database 106. Databases 104 and 106 each associate information with specific people. Some, but not necessarily all, of the people found in one of the databases are found in the other database. Each database 104/106 includes information about people that is secured such that the information cannot be shared between first secured system 102 and second secured system 104. For example, the information in database 104 can include indications that a person has performed one or more actions in a first set of actions while the information in database 106 can include indications that a person has performed one or more actions in a second set of actions and the first and second secured systems 100/102 are prevented from sharing which people performed which actions. First secured system 100 and second secured system 102 are also protected systems such that no one person can access both first secured system 100 and second secured system 102. In other words, no user authorized to use first secured system 100 is authorized to use second secured system 102. As a result, there is no one person who can access both database 104 and 106 to learn whether a single person has been associated with information stored in database 104 and with information stored in local database 106.

In the discussion below, the data stored in databases 104 and 106 is described as sets of information about a person, actions taken by the person or values of attributes of the person. In some cases, the values of the attributes can indicate an action taken by the person. For example, one of the databases can store that the person watched a particular video by storing a value of "yes" for an attribute of "watched video?" In the discussion below, references to actions can be applied to values of attributes and references to values for attributes can be applied to actions.

Figure 2:
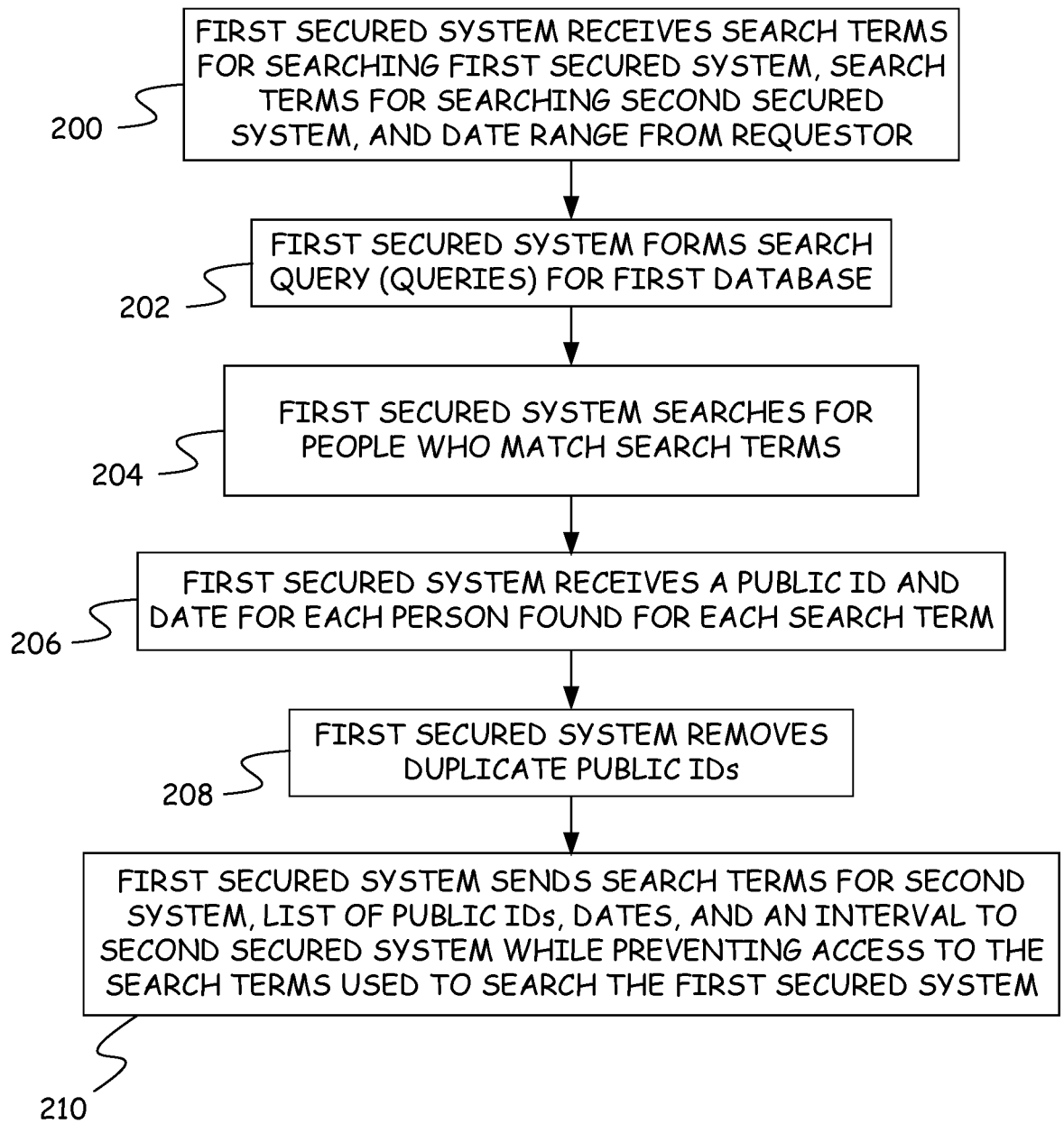
FIG. 2 is a flow diagram of part of a process in accordance with one embodiment.
Figure 3:
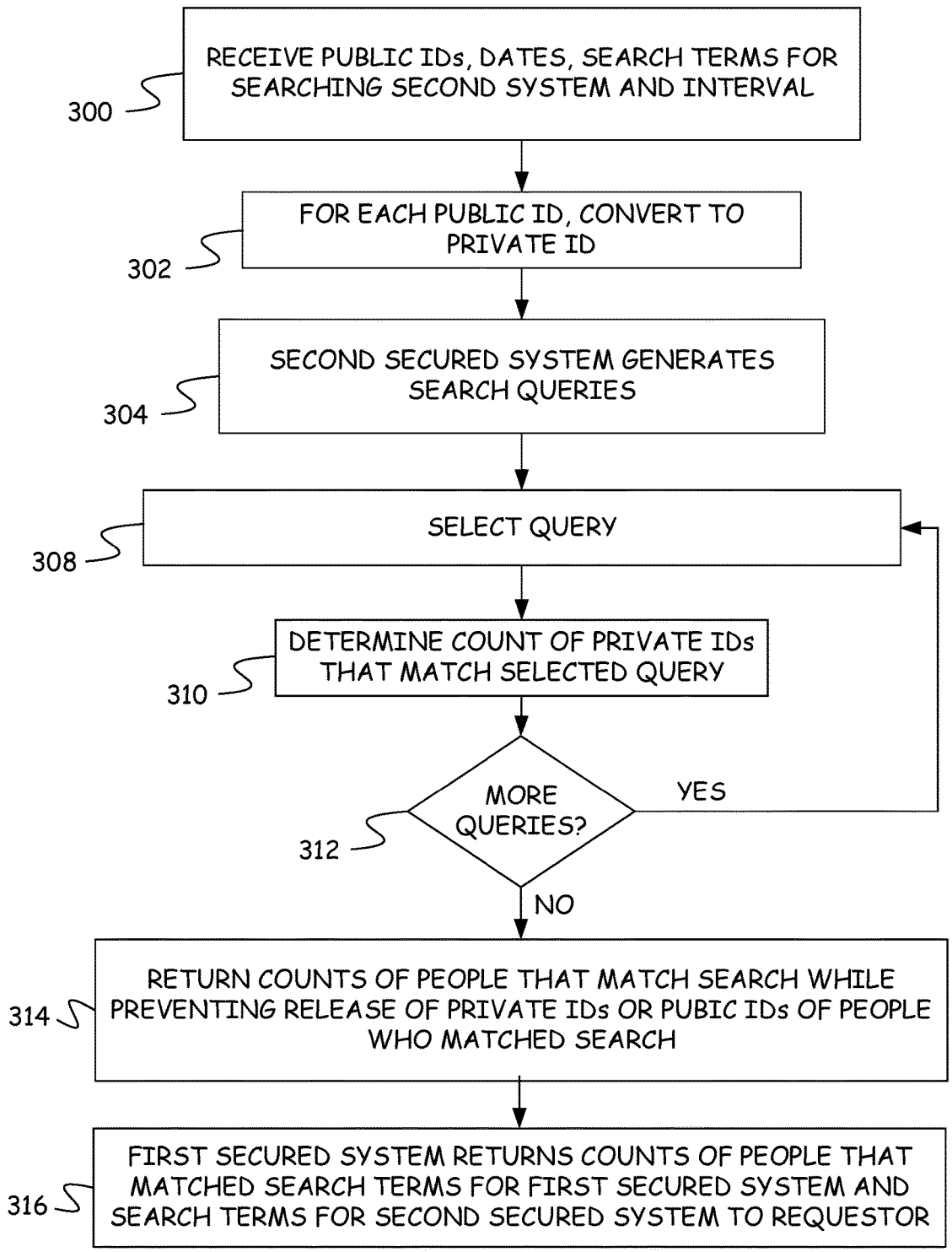
FIG. 3 is a flow diagram of a second part of the process in accordance with one embodiment.

FIGS. 2 and 3 provide a flow diagram of a method in accordance with one embodiment. In step 200 of FIG. 2, a requester 110 sends a query request to a query controller 112 of secured system 100. In the query request, requester 110 includes one or more search terms for searching database 104, one or more search terms for database 106 and, optionally, a date range.

At step 202, query controller 112 generates one or more queries based on the search terms received for searching database 104. In accordance with some embodiments, the search terms are combined into a single query that requires a person to meet all of the requirements of the search terms in order to be returned in the search results. In other embodiments, the search terms are broken into separate queries such that any person who meets the requirements of any one of the search terms is returned in the search results. In accordance with some embodiments, query controller 112 includes a time window in the search based on the date range provided by requestor 110. The time window can be the same as the date range or may be larger or smaller than the date range. The time window is used as a parameter of the search query. For example, when the query searches for people who have performed an action, the time window can be used to limit the search results to those people who performed the action during the time window.

At step 204, query controller 112 applies the queries to database 104 to search for people who match the queries. The search of database 104 returns one or more lists of public identifiers for people who matched the queries at step 206. The public identifier is uniquely identified with one particular person and is allowed to be disclosed outside of first secured system 100. In embodiments where a time window is used as part of a query, each public identifier that is returned for the query is returned with a date on which the search term was set for the person in database 104. For example, if the search term is an action taken by the person, the date that the person took the action is returned with the public identifier of the person.

At step 208, query controller 112 combines the lists of public identifiers to remove duplicate public identifiers to produce a list containing only a single occurrence of each public identifier returned by the queries.

At step 210, query controller 112 transmits the public identifiers and corresponding dates (if any) to second secured system 102 along with the search terms for searching database 106 and an optional interval to be used with the dates to specify a separate time window for each public identifier. When transmitting this information to second secured system 102, query controller 112 is prevented from giving second secured system 102 the search terms provided by requester 110 for searching database 104. Requestor 110 is similarly prevented from providing the search terms for searching database 104 to second secured system 102. As a result, second secured system 102 does not receive any indication of the search terms (attribute values or actions) that requester 110 has requested from first secured system 100. Because of this, second secured system 102 is unable to correlate the list of public identifiers to any particular attribute value or action that is stored in database 104. Instead, second secured system 102 only receives the list of public identifiers and is given no information about the significance of the public identifiers. To second secured system 102, the list of public identifiers is simply a random list of people.

In addition, first secured system 100 is prevented from providing the public identifiers returned by the queries to requestor 110. This prevents requestor 110 from building a copy of the information stored in database 104.

In step 300 of FIG. 3, a query controller 116 of second secured system 102 receives the search terms for the second secured system, the public identifiers and corresponding dates (if any) and the interval (if any) provided by query controller 112.

At step 302, query controller 116 converts each public identifier received from first secured system 100 into a private identifier that is only used within second secured system 102. This conversion is needed because database 106 does not store the public identifiers but instead only uses the private identifiers to identify people. By using only the private identifiers in database 106, the embodiments improve the security of the system because even if database 106 is breached, it will not be possible to associate the private identifiers in database 106 with the public identifiers used by first secured system 100. In accordance with one embodiment, the conversion is performed using an identifier conversion database 118.

At step 304, query controller 116 generates one or more queries based on the search terms provided in step 300. In accordance with some embodiments, the search terms are combined into a single query that requires a person's entry in database 106 to meet all of the requirements of the search terms in order to match the search terms. In other embodiments, the search terms are broken into separate queries that will provide separate counts as discussed further below. In some embodiments, the search queries are generated by using the search terms to identify further search terms. For example, if a provided search term refers to a particular item in a hierarchical structure, a search can be performed to identify all terms that are found below the provided search term in the hierarchical structure. For example, if the following hierarchical structure has been defined:

SPORTS
   FOOTBALL
   FOOTBALL VIDEO 1
   FOOTBALL VIDEO 2
   BASEBALL
   BASEBALL VIDEO 1
   BASEBALL VIDEO 2 and the received search term is "SPORTS", the additional search terms "FOOTBALL", "BASEBALL", "FOOTBALL VIDEO 1", "FOOTBALL VIDEO 2", BASEBALL VIDEO 1" and "BASEBALL VIDEO 2" could be identified by searching the hierarchical structure. Each of these search terms is then used to generate a separate query for database 106. For example, a search would be generated to find the number of people in the list of private identifiers that watched at least one video in the SPORTS category (containing FOOTBALL VIDEO 1, FOOTBALL VIDEO 2, BASEBALL VIDEO 1, BASEBALL VIDEO 2), a search would be generated to find the number of people in the list of private identifiers who watched at least one video in the FOOTBALL category (containing FOOTBALL VIDEO 1, FOOTBALL VIDEO 2), a search would be generated to find the number of people in the list of private identifiers who watched at least one video in the BASEBALL category (containing BASEBALL VIDEO 1, BASEBALL VIDEO 2), and separate searches would be generated to determine the number of people who viewed each individual video: FOOTBALL VIDEO 1, FOOTBALL VIDEO 2, BASEBALL VIDEO 1, BASEBALL VIDEO 2.

In accordance with one embodiment, a generated search query is augmented by a requirement that the entries would have matched the search terms during a date range specified by the combination of the date received with the corresponding public identifier and the interval received in step 300. For example, if the search terms require a person to have performed an action, the search of database 106 can involve determining if a person associated with a private identifier performed the action within a date range that spans the length of the interval and ends on the date provided for the public identifier.

At step 308, query controller 116 selects one of the generated queries and at step 310 searches database 106 to determine which of the private identifiers produced by the conversion at step 302 have entries in database 106 that match the selected search query. For each private identifier produced by the conversion that matches the selected query, query controller 116 increases a count for the query by one.

At step 312, query controller 116 determines if there are more queries to apply to database 106. If there are more queries, query controller 116 returns to step 308 to select the next query.

When all of the queries have been processed, query controller 116 returns the determined counts together with the associated query terms to query controller 112 at step 314. For example, if queries had been performed for each of "SPORTS", "FOOTBALL", "BASEBALL", "FOOTBALL VIDEO 1", "FOOTBALL VIDEO 2", BASEBALL VIDEO 1" and "BASEBALL VIDEO 2" as in the example above, a separate count would be provided for each of these queries together with the associated query term. In an XML format, such counts would returned as:

```

<term>SPORTS</term>
    <count>8</count>
  </result>

<term>FOOTBALL</term>
    <count>7</count>
  </result>

<term>FOOTBALL VIDEO 1</term>
    <count>7</count>
  </result>

<term>FOOTBALL VIDEO 2</term>
    <count>1</count>
```

-continued

```
  </result>

<term>BASEBALL</term>
    <count>3</count>
  </result>

<term>BASEBALL VIDEO 1</term>
    <count>1</count>
  </result>

<term>BASEBALL VIDEO 2</term>
    <count>3</count>
  </result>

```

Note that in the example above, the sum of the counts of the lower elements in the hierarchy do not have to equal the count for the element of the hierarchy that is above the lower elements. For example, the sum of the counts for FOOTBALL VIDEO 1 and FOOTBALL VIDEO 2 does not equal the count for the FOOTBALL category. The reason for this is that a same person could have watched both FOOTBALL VIDEO 1 and FOOTBALL VIDEO 2 but would only be counted once for watching videos in the FOOTBALL category.

When the counts are returned, query controller 116 is prevented from releasing the private identifiers or the public identifiers associated with each count. As a result, first secured system 100 and requestor 110 are unable to determine which person matched the search terms applied to database 106. Because of this, first secured system 100 and requestor 110 are unable to combine the information that first secured system 100 has for people with information that second secured system 102 has for people.

At step 316, query controller 112 returns the counts provided by query controller 116 to requestor 110. In accordance with one embodiment, query controller 112 can additionally provide a count of the number of people who matched the search terms applied to database 104. This allows the requestor to determine how the count of the number of people who matched the search terms for both database 104 and database 106 compares to the number of people who match the search terms for database 104. For example, the requestor can determine the ratio of the number of people who match the search terms for both database 104 and 106 over the number of people who match the search terms for database 104.

Figure 4:
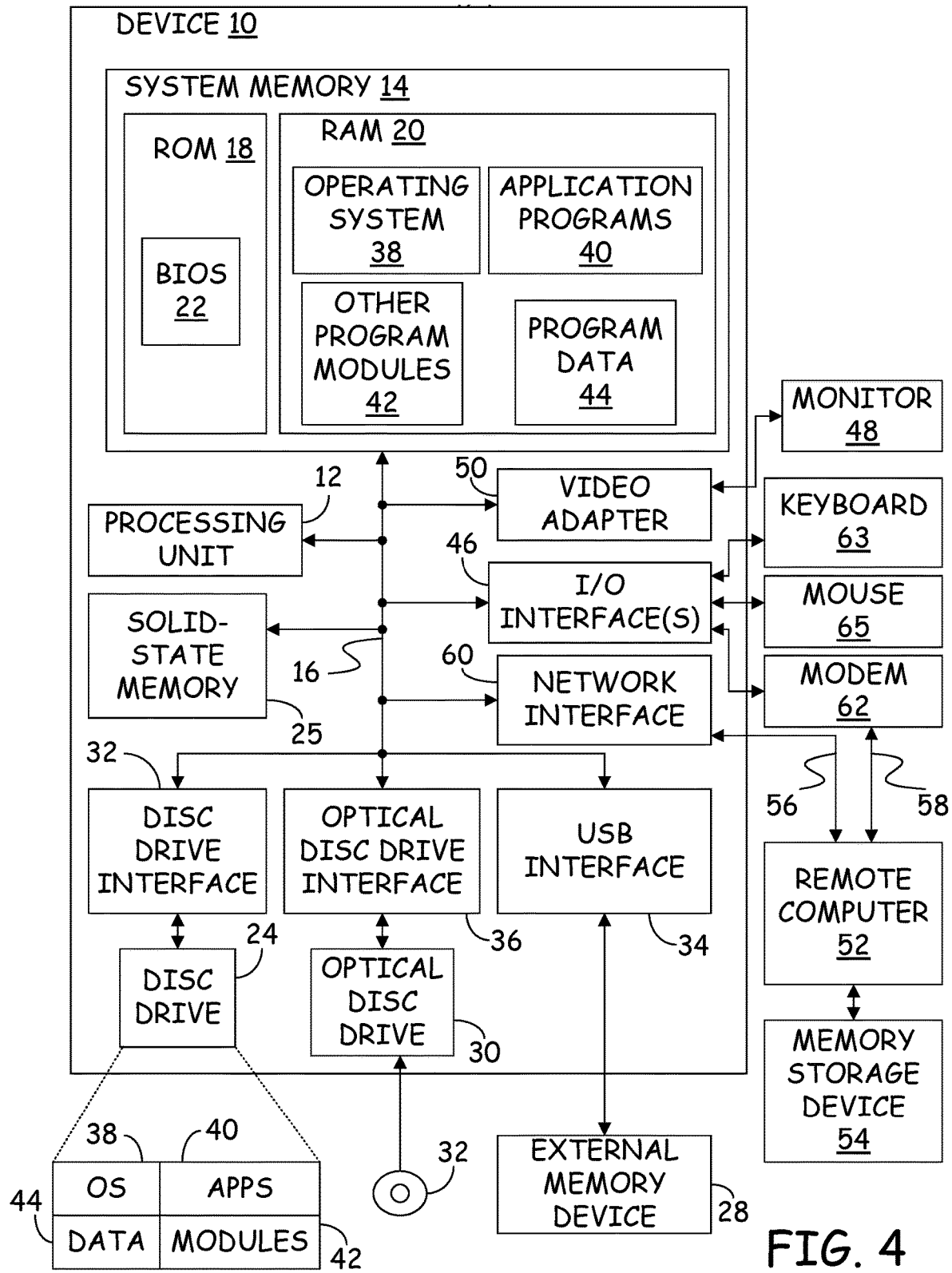
FIG. 4 is a block diagram of a computing device that can be used as a server in the various embodiments.

FIG. 4 provides an example of a computing device 10 that can be used to implement one or more of the servers discussed above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the applications discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 4. The network connections depicted in FIG. 4 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 4 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
receiving a first search term and a second search term as part of a request for a number of people who match both the first search term and the second search term;
using the first search term to search a first system that associates the first search term with a plurality of people to retrieve a respective identifier for each of the plurality of people;
using the second search term and the plurality of identifiers to search a second system that associates the second search term with a second plurality of people to return a count of the number of people who are in both the first plurality of people and the second plurality of people, wherein the second system is prevented from associating the first search term with a person and from releasing the association between the second search term and the second plurality of people; and
returning the count as the number of people who have both the first search term and the second search term.

2. The computer-implemented method of claim 1 wherein the first system is prevented from accessing information that links the second search term to a person.

3. The computer-implemented method of claim 2 wherein the first system is prevented from accessing information that links the second search term to a person by the second system being prevented from releasing the association between the second search term and the second plurality of people.

4. The computer-implemented method of claim 1 wherein the first system is prevented from releasing the association between the first search term and a person.

5. The computer-implemented method of claim 1 wherein the second system is prevented from associating the first search term with a person by the first system being prevented from releasing the association between the first search term and the first plurality of people.

6. The computer-implemented method of claim 1 further comprising the search of the first system retrieving a respective date for each of the plurality of people and the date being used during the search of the second system.

7. The computer-implemented system of claim 1 wherein the first system and the second system together prevent identification of a single person as matching both the first search term and the second search term.

8. A method of isolating systems containing information about people, the method comprising:
allowing a first system containing a first set of information about people to receive a request from a requestor that identifies a first value for the first set of information and a second value for a second set of information, to retrieve respective identifiers for people for whom the first set of information has the first value, and provide the identifiers and the second value to a second system while preventing the first system from returning the identifiers to the requestor and while preventing the first system from providing the first value to the second system;
allowing the second system to receive the identifiers and the second value, to use the identifiers to determine a count of how many of the people represented by the identifiers have the second value for the second set of information while preventing the second system from providing identifiers of the people for whom the second set of information has the second value to any of the first system and the requestor; and returning the count to the requestor.

9. The method of claim 8 wherein the first system is inaccessible to anyone with access to the second system.

10. The method of claim 9 wherein the second system is inaccessible to anyone with access to the first system.

11. The method of claim 8 wherein the second system converts the identifiers into private identifiers wherein the second system is prevented from providing the private identifiers to any of the first system and the requestor.

12. The method of claim 8 wherein the first system further retrieves a respective date for each of the people for whom the first set of information has the first value.

13. The method of claim 12 wherein the first system provides the dates to the second system.

14. The method of claim 13 wherein the second system uses the dates to determine a count how many of the people represented by the identifiers have the second value for the second set of information.

15. A method comprising:

receiving a request for a number of people who have performed both a first and second action from a requestor;

using a first system to identify a list of people who have performed the first action without disclosing the identities of the people to the requestor;

providing the list of identified people to a second system and using the second system to determine a count of how many of the identified people in the list performed the second action without disclosing which of the identified people performed the second action to any of the first system and the requestor; and returning the count to the requestor.

16. The method of claim 15 further comprising preventing the second system from acquiring the first action provided in the request.

17. The method of claim 15 wherein no user authorized to use the first system is authorized to use the second system.

18. The method of claim 15 wherein the second system associates a respective private identifier with each person who performs the second action, and wherein the second system prevents the first system and the requestor from receiving the private identifiers.

19. The method of claim 15 wherein the first system further identifies a respective date when each identified person performed the first action and the dates are provided with the list of identified people to the second system.

20. The method of claim 19 wherein determining a count of how many of the identified people performed the second action comprises determining a count of how many of the identified people performed the second action within a respective window of time defined in part by the respective dates when the identified people performed the first action.

\* \* \* \* \*